United States Patent
Hadi Salim et al.

(10) Patent No.: US 6,625,118 B1
(45) Date of Patent: Sep. 23, 2003

(54) RECEIVER BASED CONGESTION CONTROL

(75) Inventors: Jamal Hadi Salim, Nepean (CA); Biswajit Nandy, Ottawa (CA); Nabil Seddigh, Ottawa (CA); Joseph Fook-Kong Thoo, Saratoga, CA (US)

(73) Assignee: Nortel Networks Corporation, Montreal (CA)

(*) Notice: Subject to any disclaimer, the term of this patent is extended or adjusted under 35 U.S.C. 154(b) by 0 days.

(21) Appl. No.: 09/306,414

(22) Filed: May 6, 1999

(30) Foreign Application Priority Data

May 8, 1998 (CA) ............................................ 2237264

(51) Int. Cl.$^7$ .............................................. H04L 12/28
(52) U.S. Cl. ........................................ 370/229; 370/236
(58) Field of Search .................. 370/229, 252, 370/389, 468, 231, 236, 397, 294; 709/235

(56) References Cited

U.S. PATENT DOCUMENTS

| | | | | |
|---|---|---|---|---|
| 4,769,815 A | * | 9/1988 | Hinch et al. ................. | 370/236 |
| 5,093,151 A | * | 3/1992 | van den Berg et al. ...... | 427/569 |
| 5,313,454 A | | 5/1994 | Bustini et al. | |
| 5,367,523 A | * | 11/1994 | Chang et al. ................ | 370/235 |
| 5,377,327 A | | 12/1994 | Jain et al. ................... | 395/200 |
| 5,426,635 A | * | 6/1995 | Mitra et al. ................. | 370/229 |
| 5,646,943 A | * | 7/1997 | Elwalid ...................... | 370/230 |
| 5,650,993 A | * | 7/1997 | Lakshman et al. .......... | 370/236 |
| 5,748,900 A | * | 5/1998 | Scott et al. ................. | 370/229 |
| 5,748,901 A | * | 5/1998 | Afek et al. .................. | 370/229 |
| 5,892,794 A | * | 4/1999 | Slegers ....................... | 370/294 |
| 6,119,235 A | * | 9/2000 | Vaid et al. ................... | 709/235 |
| 6,219,713 B1 | * | 4/2001 | Ruutu et al. ................ | 709/235 |

OTHER PUBLICATIONS

Floyd, S, TCP and Explicit Congestion Notification Sig94 paper pp 1–18.*
Madhow, U, Dynamic Congestion Control and Error Recovery over a Heterogeneous Internet, Proceedings of the 36th Conference on Decision and Control, Dec., 1997.*
Floyd, Sig94 paper "TCP and Explicit Congestion Notification", pp. 1–18.

* cited by examiner

Primary Examiner—Salvatore Cangialosi
(74) Attorney, Agent, or Firm—Foley & Lardner (57) ABSTRACT

In a packet network, on receiving a packet a receiving host determines if the packet has been marked by any of the nodes through which it passed, to indicate congestion at that node, e.g. by checking the CE bit in an IP header. A packet flow control parameter is generated at the receiving side, and sent to the source using an Internet Protocol, as part of the packet acknowledgment, to control the flow of packets from the source, according to the packet flow control parameter. This can reduce control loop delays caused by waiting at the source for a number of acknowledgments to arrive before the congestion level can be calculated. Conditions at the receiver which may be different to those at the source can now be taken into account in the flow control.

18 Claims, 12 Drawing Sheets

RECEIVER BASED CONGESTION CONTROL

RELATED APPLICATIONS

This application is related to U.S. patent application Ser. No. 09/306,421 entitled CONGESTION NOTIFICATION FROM ROUTER filed concurrently herewith, and hereby incorporated by reference.

BACKGROUND OF THE INVENTION

1. Field of the Invention

The invention relates to a receiver apparatus for use in packet networks, to a source node apparatus for use in Internet Protocol networks, to methods of processing packets in Internet Protocol networks, and to corresponding software.

2. Background Art

Congestion in packet networks may occur for example at routers where flows converge from different sources. As complicated networks may consist of numerous different end systems (sources and receivers), routers, and links, it is usually impossible to match their capacities perfectly. Accordingly, congestion will occur where more packets are received than can be handled. Various ways of handling congestion are known. At the simplest level, buffering is provided to handle temporary overloads. For longer overloads, flow control mechanisms are provided, to enable downstream elements to cause the source to reduce the rate of sending packets.

If a buffer overflows before the source reduces the flow, then packets will be discarded. The source may eventually detect that these packets have not been acknowledged, and retransmit them. This can make the congestion worse, and lead to complete collapse of the network. On the other hand, if the flow control is made too strong to avoid such a collapse, the throughput of the network may be very low, thus making inefficient use of resources.

Other mechanisms to improve efficiency include admission control, preallocation of buffers, and delay sensitive routing, to avoid congested regions.

Flow control relies on some sort of notification of congestion. This may be implicit or explicit. Congestion can be inferred for example from detecting at the source that packets have been discarded downstream, or detecting delays in the time taken for a packet to arrive. However, with such methods there may be a considerable lag between the congestion occurring, and it being detected. Also, it is possible that the packets were discarded or delayed for reasons other than congestion, e.g. link failure, or erroneous routing. Accordingly, explicit congestion notification mechanisms have been used. One method is described in U.S. Pat. No. 5,377,327 (Jain et al) in the context of a system in which at intermediate nodes, a flow is allocated a share of the capacity. If the allocation is exceeded, a flag is set in each packet. The flags may be counted and if the proportion of packets with the flag set exceeds a threshold, then the flow from the source is adjusted.

Another example is in Frame Relay, a data link layer protocol which has both forward explicit congestion notification (FECN) for notifying the receiver, and backward explicit congestion notification for notifying the source directly. ATM also has an FECN mechanism. The Internet Protocols (IP) also include an FECN and a BECN mechanism. The BECN mechanism is in the form of an Internet Control Message Protocol (ICMP) message called the ICMP Source Quench (ISQ) message. However, it is currently recommended that this message not be used, as it may consume too much bandwidth, and thus contribute to the congestion, and is unfair and ineffective in determining which of multiple flows should be limited.

It has been proposed that ISQs be used in conjunction with random early detection (RED) routers, to enable the rate of sending ISQs to be limited, and reflect how much each flow is contributing to the congestion. However, this has not been adopted, and instead, current practice in TCP/IP (Transport Control Protocol/Internet Protocol) involves using TCP, a transport layer protocol, to determine either lost packets or increases in delays using a timeout mechanism, or determining increases in delays, by timing the acknowledgment sent back by the TCP receiver. This enables the TCP sender to infer congestion and react by reducing its window for that flow, that is, the number of packets it can send towards a given receiver before it must wait for acknowledgments from the receiver.

Floyd discloses a methodology for doing ECN for IP. Floyd suggests the use of RED gateways to detect incipient congestion before the queue overflows. The congestion causing packets are marked on their way to the receiver end system (from the sender end system), with a probability proportional to their bandwidth usage, using the CE (Congestion Experienced) bit in the IP header. When the receiver end system receives the congestion causing packet they inform the sender end system to slow down when ACKing that packet by setting the ECE (Explicit Congestion Echo) bit in the TCP header.

The use of ECN capable gateways for notifying end systems prevents unnecessary packet drops. In the ideal situation where everyone supports ECN at the end system as well as the intermediate nodes, sources are now informed quickly and unambiguously that there is congestion in the network and therefore do not have to rely on extrapolating that condition. Floyd also suggests that with the use of tagging congestion-causing packets, other types of networks that the IP packet traverses (e.g., ATM) can employ their own congestion control algorithms as well as have the ability to mark congestion causing packets.

SUMMARY OF THE INVENTION

It is an object of the invention to provide improved methods and apparatus. According to a first aspect of the invention there is provided a receiver apparatus for use in an Internet Protocol network comprising a plurality of nodes, the apparatus comprising:

input means for receiving a packet sent across the network using the Internet Protocol;

packet reading means for determining if the packet has been marked according to the Internet Protocol by any of the nodes through which it passed, to indicate congestion at that node;

a packet flow control parameter generator responsive to the packet reading means, for determining a packet flow control parameter; and output means for sending a message to the source, to control the flow of packets from the source, according to the packet flow control parameter.

An advantage of enabling the receiver to contribute to the flow control is that it can reduce control loop delays caused by waiting at the source for a number of acknowledgments to arrive. Also, it can improve reliability since it enables the receiver to force a rogue source to slow its flow of packets.

A further advantage is that the receiver may be aware of different local information and or conditions to those of the source, or may have a more up to date control algorithm, so overall effectiveness of the flow control may be improved if it is adapted by the receiver.

Preferably, the sending means is arranged to send the packet flow control parameter in the message.

An advantage of this is that the receiver may have more direct control over the flow.

Preferably, the message is an acknowledgment of receipt of the packet.

An advantage of this is that it helps keep the number of packets returned to the source, to a minimum. Furthermore, since many protocols already cater for sending acknowledgments, in many cases it will be easy to adapt them in this way, and there may be no additional bandwidth taken up by the message.

Preferably, the message is an acknowledgment of receipt of the packet, and the output means is arranged to delay the acknowledgment on the basis of the packet flow control parameter.

An advantage of this is that the receiver can enter the control loop with little or no modification to the source if it is already arranged to carry out flow control on the basis of acknowledgments received in a given time period. Hence this may give better backward compatibility.

Preferably the packet flow control parameter generator is arranged to be dependent additionally on whether preceding packets were marked.

This enables the control to be more steady in response to transient congestion for example.

Preferably the packet flow control parameter comprises an offered window size, for indicating to the source node how many packets can be sent before the source should wait for an acknowledgement from the receiver.

An advantage of using this parameter is that existing apparatus is arranged to negotiate window size as part of flow set up, and so can be adapted more easily to this new arrangement.

Preferably the message is an acknowledgment of receipt of the packet, the output means being arranged to send the same packet flow control parameter again in an acknowledgment sent in response to a subsequent packet.

An advantage of this is that it may reduce the risk of flow control being affected by the acknowledgments being delayed or lost in transit.

Preferably the packet flow control parameter generator is operable according to redefinable parameters.

An advantage of this is that the flow control can be updated or tailored more easily.

Preferably the packet flow control parameter generator is operable additionally according to a receiver specific parameter.

This enables different receivers to control the flow to suit their local conditions better.

Another aspect of the invention provides a source node apparatus for use in an Internet Protocol network comprising a plurality of nodes, the apparatus comprising:

a packet sending means for sending a packet using across the Internet Protocol network to one of the nodes acting as a receiving node;

a receiver for receiving from the receiving node a packet flow control parameter sent across the Internet Protocol network; and a flow controller coupled to the packet sending means for controlling a rate of flow of sending further packets from the sending means to the receiving node on the basis of the packet flow control parameter.

Preferably the receiver is capable of receiving congestion notification messages from other nodes in the path of the packet between the source node and the receiving node, the flow controller being operable to control the rate of flow on the basis of the congestion notification messages received from the other nodes.

Another aspect of the invention provides a method of processing packets in an Internet Protocol network comprising a receiver node, a source node and intermediate nodes, the method comprising the steps of: at the receiver node, receiving a packet sent across the network using the Internet Protocol;

determining if the packet has been marked by any of the nodes through which it passed, to indicate congestion at that node;

determining a packet flow control parameter on the basis of the determination of a marking; and sending a message to the source node across the Internet Protocol network, to control the flow of packets from the source node, according to the packet flow control parameter.

Preferably the method further comprises the steps of: at the source node, receiving the message; and controlling a rate of flow of sending further packets to the receiving node on the basis of the message.

Preferably the message contains the packet flow control parameter, the controlling step being made on the basis of the parameter.

Preferably the method, further comprises the step of delaying sending the message from the receiver node, on the basis of the flow control parameter, the flow controlling step being made by the source on the basis of the time of arrival of the message.

Preferably the method further comprises the preliminary step of determining if the intermediate nodes are able to send congestion notification messages to the source node, the step of determining the flow control parameter at the receiver being carried out on the basis of whether the intermediate nodes are capable of sending congestion notification messages to the source.

Preferably a method uses an application to transmit data across a network, the application causing the network to use a receiver apparatus as set out above to transmit the data. Another aspect of the invention provides software on a computer readable medium for carrying out the above methods.

Any of the preferred features may be combined, and combined with any aspect of the invention, as would be apparent to a person skilled in the art. Other advantages will be apparent to a person skilled in the art, particularly in relation to prior art other than that mentioned above.

To show, by way of example, how to put the invention into practice, embodiments will now be described in more detail, with reference to the accompanying drawings.

DETAILED DESCRIPTION

Figure 1:
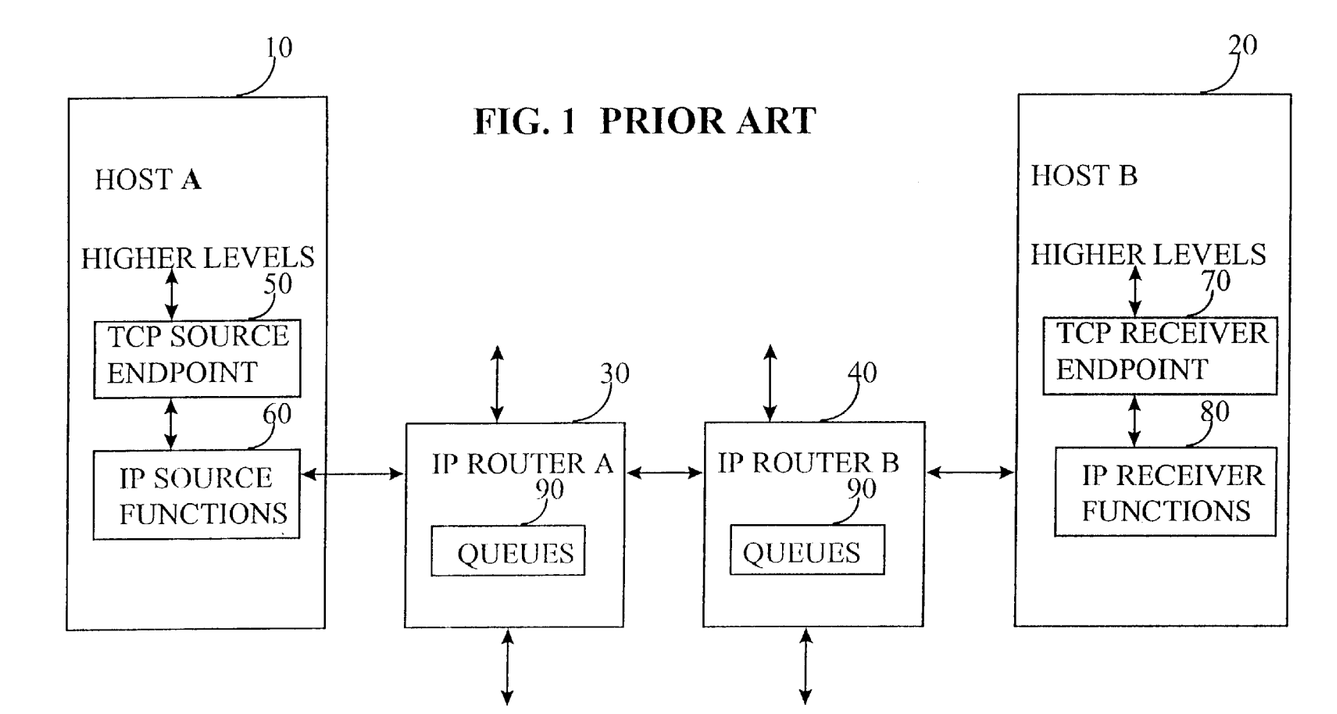
FIGS. 1 to 3 show known arrangements.
Figure 2:
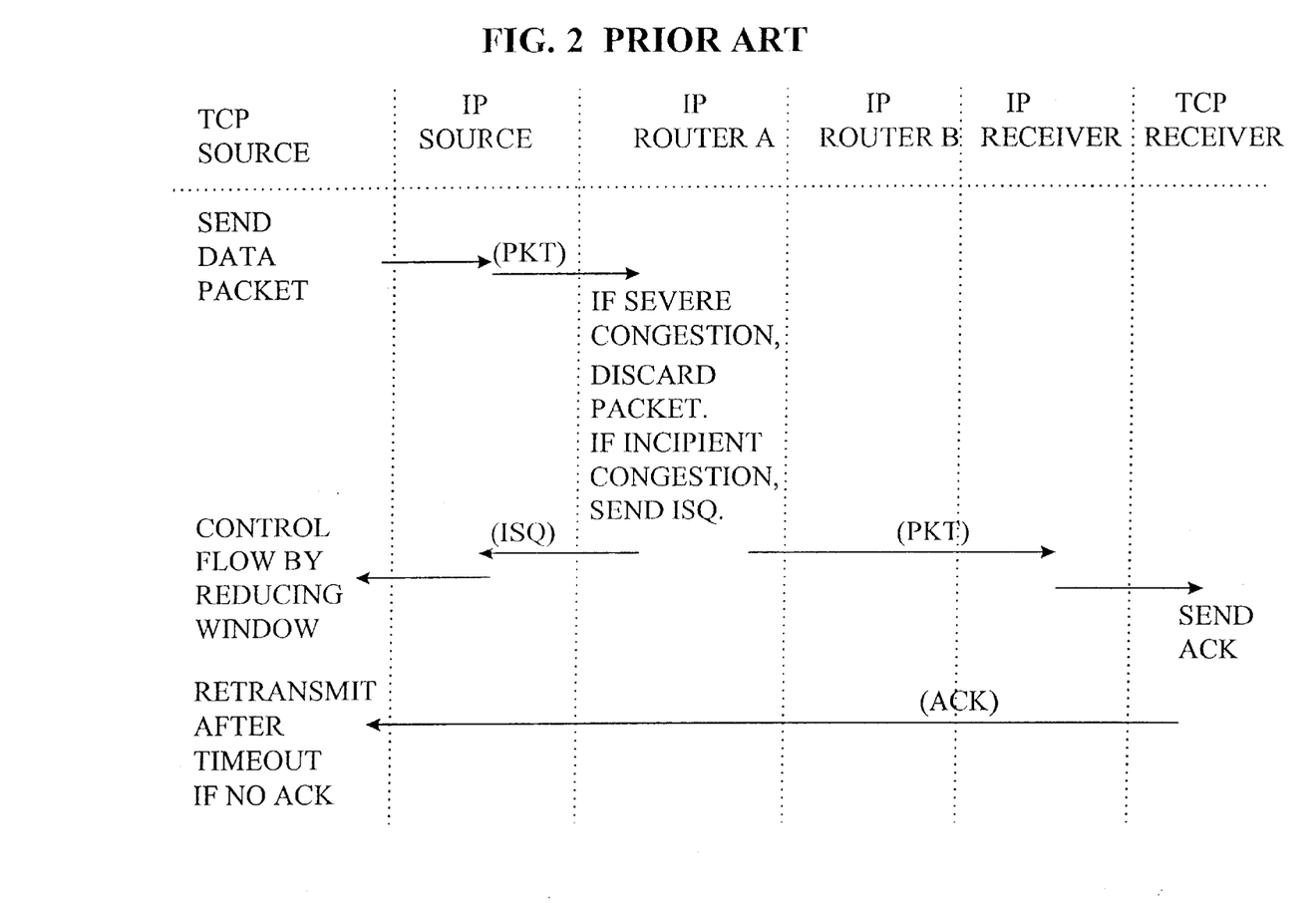
Figure 3:
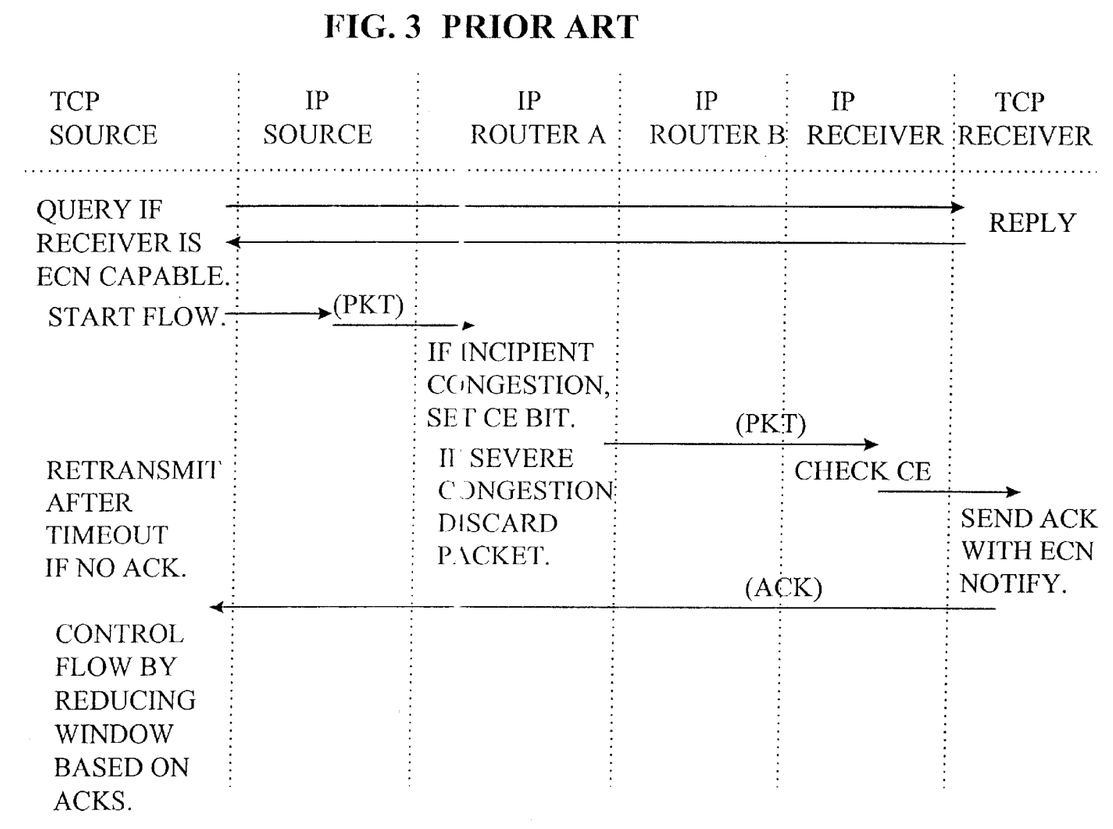

FIGS. 1–3, prior art

FIG. 1 shows in schematic form some of the principal elements in a network using TCP/IP. A host A,10 is being used to send data to another host B,20, across an IP network. An application running on host A, or remotely, delivers the data to be transmitted to a TCP source endpoint, 50. This passes the data to IP source functions 60. The source functions send IP data packets to an IP router A,30. The packets are routed via another IP router B,40, and eventually reach the IP receiver functions 80 on host B. The IP receiver functions 80 demultiplex the IP packets and pass the data to the TCP receiver endpoint 70 in the host B. The TCP receiver transfers the data to higher level software in the host B.

As indicated by the vertical arrows to the IP routers A and B, 30 and 40, many other paths may converge at the routers. Queues 90 are provided, to handle transient congestion. In practice there may be many more than three hops between source and receiver. TCP/IP is shown as an example, but there are many other protocols for which a similar arrangement would apply, both in OSI layers 4 and 3 respectively, and in other layers.

FIG. 2 shows some of the principal actions of each of the elements of FIG. 1, for the proposal mentioned above that ISQ messages be used as a congestion notification system. The TCP source sends data via the IP source to router A. If there is severe congestion at router A, the packet may be discarded. If the router detects incipient congestion, an ISQ is sent back to the IP source. The IP source will interpret the ISQ and pass an indication up to the TCP source functions, notifying of the congestion at router A, on the flow to the TCP receiver at host B.

The TCP source functions react by reducing the window to control the flow. If the packet is not discarded by router A, it is forwarded on via router B to the IP receiver and ultimately to the TCP receiver. The TCP receiver sends an acknowledgement back to the TCP source.

FIG. 3 shows an example of the above-mentioned proposal by Floyd. Again the actions of the principal elements of FIG. 1 are shown. There may be an initial negotiation before flow starts, between the TCP source and the TCP receiver. The source may query if the TCP receiver is ECN capable. If the TCP receiver replies positively, e.g., by using the ECN notify bit (also called the ECN-ECHO bit) in the SYN packet or the SYN-ACK packet.

If both TCP source and TCP receiver are ECN capable, the TCP source instructs the IP source to set the ECT bit in the IP header of data packets for that flow. If the router A detects incipient congestion, it may either discard the packet, if the congestion is too severe, or, if less severe, it can mark the packet by setting the CE bit in the IP header. When a marked packet is received by the IP receiver, it will notify the TCP receiver of the congestion notification. The TCP receiver will then send an ACK with the ECN notify bit set. This is sent back to the TCP source, which reacts by reducing the window size to control the flow. The source does not respond to further ECN ACKs until the end of that window.

If no ACK is received for any reason, e.g., router A has discarded the packet, after a time-out, the TCP source retransmits the packet.

If a packet is received at the source with ECN-notify set in the TCP header then the source knows that there is network congestion and reacts by halving both the congestion window, cwnd and the slow start threshold value, ssthresh.

The source does not react to ECN more than once per window. Upon receipt of an ECN-notify packet at time t, it notes the packets that are outstanding at that time (sent but not yet acked, snd_una) and waits until a time u when they have all been acknowledged before reacting to a new ECN message. The sender does not increase the congestion window in response to an ACK if the ECN-notify bit is set. Incoming acks will still be used to clock out data if the congestion window allows it. TCP still follows existing algorithms for sending data packets in response to incoming ACKs, multiple duplicate ACKs or retransmit timeouts.

Figure 4:
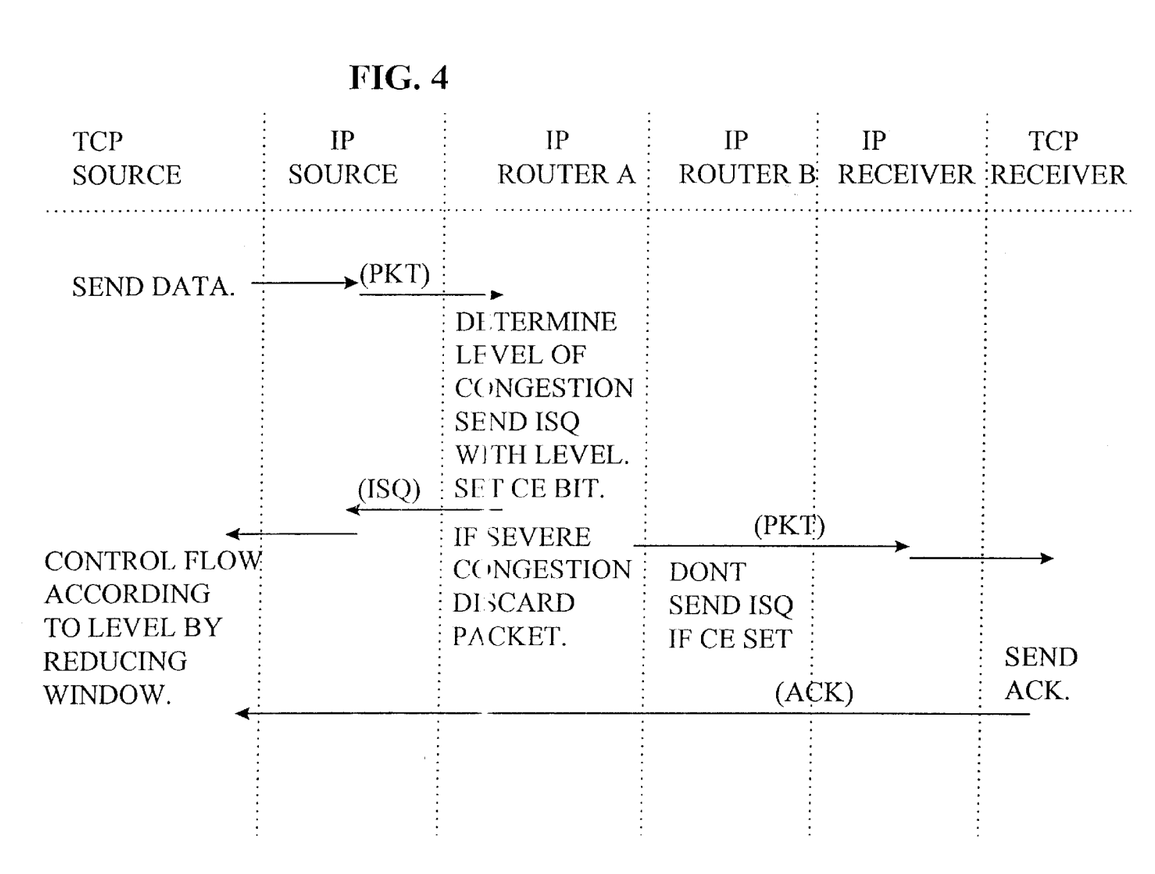
FIG. 4 shows in sequence chart form the actions of elements in a TCP/IP network corresponding to that shown in FIG. 1, according to an embodiment of the invention showing sending a congestion level in an ISQ.

FIG. 4—embodiment using ISQ

FIG. 4 shows the actions of elements in a TCP/IP network corresponding to that shown in FIG. 1. The TCP source sends a data to the IP source, which sends it in the form of IP packets to router A. Router A determines the degree of congestion. It discards the packet if congestion is very severe, and sends an ISQ back to the IP source. For other levels of congestion, it sends an ISQ to the source indicating the level of congestion, and marks the packet by setting the CE bit, before passing it on to router B. Router B does the same except that if the packet was marked by a preceding router, it does not send a further ISQ, since the TCP source has already been alerted by the first ISQ. An exception is where the congestion is more severe in IP router B. For example, if the packet is discarded at IP router B, then sending an ISQ from router B to TCP source may be justified, to enable more drastic flow control to be implemented if desired.

The IP receiver, unlike the prior art case shown in FIG. 3, does not need to be ECN capable, since the ISQ notification is enough for flow control. Nevertheless, if the receiver is ECN capable, perhaps for compatibility, it would detect whether the CE bit and ECT bit are set in the IP header, and notify the TCP receiver of the congestion indicated by these bits. As in FIG. 3, the TCP receiver sends an ACK with the ECN notify bit set, back to the TCP source. This may or may not be used by the source, in addition to the notification from the ISQs. As will be discussed in more detail below, the TCP source will control the flow of packets by reducing its window, according to the level of congestion indicated in the ISQ. If it can also control the flow according to whether ACK packets received have their ECN notify bit set or not, it may be advantageous, for compatibility with intermediate router nodes which cannot send ISQs.

Figure 5A:
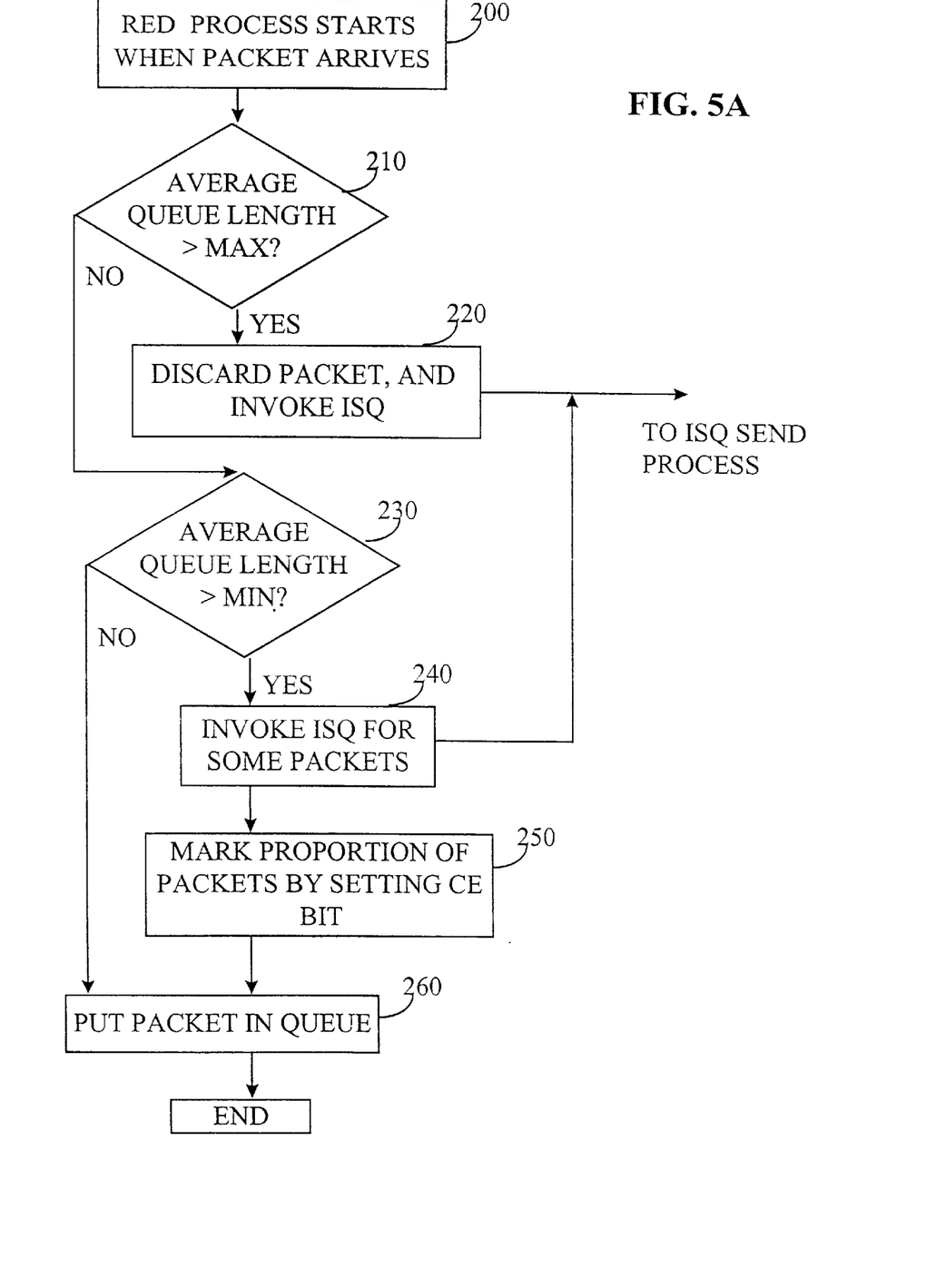
FIG. 5A shows parts of a RED process in a router carrying out the actions of FIG. 4.
Figure 5B:
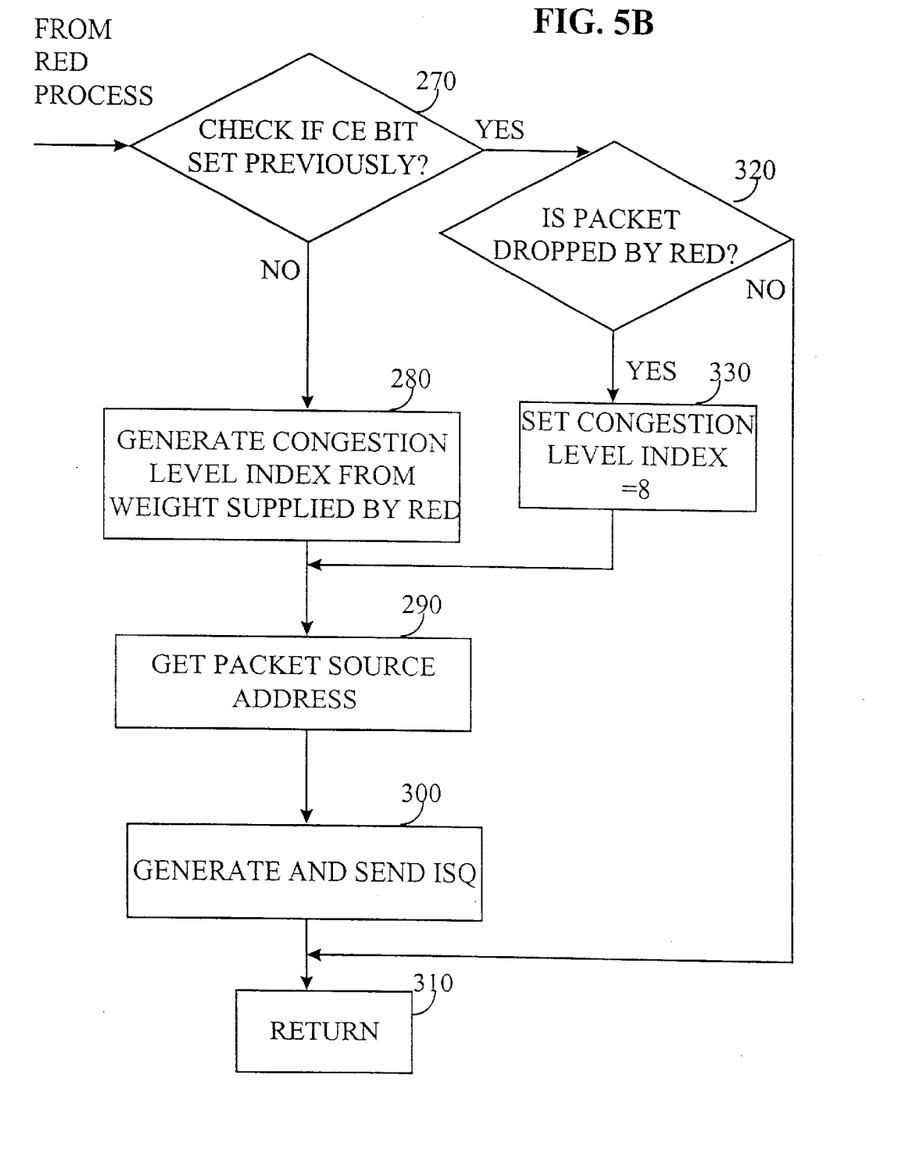
FIG. 5B shows parts of an ISQ send process in a router carrying out actions of FIG. 4.

FIGS. 5A,5B—example of router actions of FIG. 4

FIGS. 5A and 5B show in more detail two processes happening inside the router in the embodiment of FIG. 4: Firstly a random early detection (RED) process, and secondly an ISQ sending process, which may be invoked by the RED process. The RED process is an example of a congestion monitor. It is known and well documented, and need not be described here in detail. It monitors average queue lengths using a low pass filter. Many other methods could be used. The ISQ is an example of a mechanism for sending an indication of this degree of congestion to the source node, using an OSI network layer protocol. Other mechanisms can be used for this and other protocols.

In the RED process, at 200, an incoming packet arrives. At 210 the process determines if the average queue length is greater than a predetermined maximum threshold. If so, the packet may be discarded and the ISQ sending process invoked.

Otherwise, at 230, it is determined if the average queue length is greater than a minimum threshold. If so, again, the ISQ sending process may be invoked, at 240, depending on whether the packet is chosen by the RED process for marking, 250. Only a proportion of packets are marked at this stage. The proportion is made dependent on the relative bandwidth used by each flow. This is designed to improve the fairness of the congestion notification, and make the overall flow control for many paths, more stable. This is one example of a mechanism for making the indication to the source proportional to how much the packets from the source contribute to the congestion, relative to packets from other nodes. Other examples can be used to achieve the same advantage, either based on sending messages selectively, i.e. limiting the rate of sending indications, or by other methods, such as indicating explicitly in the indication, and/or the marking, what is the proportion of the congestion attributable to a given flow, or connection.

At 260, the packet is placed in an appropriate queue in the router. This also takes place if the average queue size is less than the minimum threshold.

The ISQ send process begins at 270 by checking if the CE bit has been set previously. If not, at 280, a congestion level index is derived from the congestion level in the router, obtained by the RED process from the size of the queues. At 290 the packet source address is obtained, and the ISQ generated using the packet source address and the congestion level index. There is an unused 32 bit field in the ISQ which can be used for the level index. It is sent back to the IP source, and the process returns at 310.

If the CE bit has been set previously, at 320, it is determined if the packet has been dropped by the RED process. If not, the process returns. Otherwise, the congestion level index is set at a maximum, eight in this case, and the ISQ is generated and sent on the basis of this index and the packet source address. This means where there are multiple congested routers in the path, they will be dealt with in order, starting with the one closest to the source. Any bias in this will be mitigated by having an ISQ sent if a second or subsequent congested router discards a packet. This will contribute to the flow control at the source. If more balance is warranted, downstream routers could be allowed to send ISQs in some circumstances when they are not discarding a packet, but they find the CE bit already set.

Figure 6:
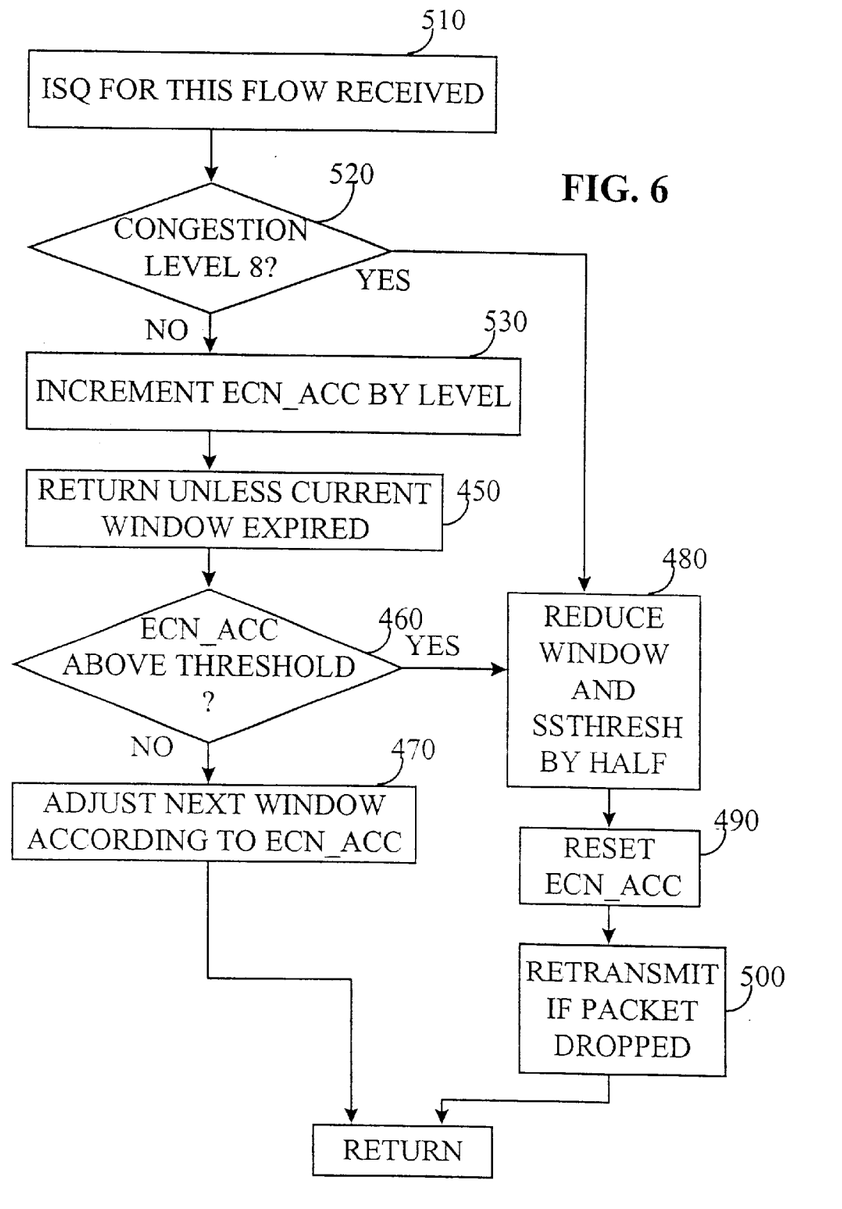
FIG. 6 shows an example of flow control actions of FIG. 4 of a TCP source receiving an ISQ.

FIG. 6—TCP source response to ISQ

FIG. 6 shows in more detail the actions of a TCP source in the embodiment of FIG. 4. The TCP source may be arranged to responds to congestion notification from either the intermediate nodes, or from the receiver, or both. In the case of being responsive to both, it could be arranged to respond to either type individually, or be arranged to control a flow on the basis of both types of notification simultaneously. The example of response to ISQs will now be described in more detail.

At 510, an ISQ is received for this flow. Different flows, for each different source-receiver pair, will have their own process. If it is determined at 520 from the ISQ that the congestion level is severe, e.g. level 8 in this example, then a rapid response is made. Otherwise, a more measured, gradual control algorithm is carried out.

The rapid response, 480, involves reducing the window by half and reducing the value of SSTHRESH by half. This value represents a threshold for the TCP slow starting procedure. This defines how the window is increased in size following a slow start, which involves reducing the window to one. At 490, the value of ECN_ACC is reset following this drastic window reduction. If it was caused by a level 8 ISQ, the source infers that the packet was dropped, and retransmitted at 500.

The example of the more gradual response involves incrementing a counter ECN_ACC, by the level of the congestion, 530. The counter reflects the number and severity of the congestion notifications received over a time period for a given flow. The flow is controlled by adjusting the window size. The window size indicates how many packets can be sent before the source must wait for an acknowledgment from the receiver. The source is constrained not to change the window size before the end of the current window, to meet standards, and ensure compatibility with receivers. Hence the counter may be incremented by numerous ISQs from successive packets, before the end of the window. The process returns at 450 to await the end of the window. The counter need only be compared, 460, to a threshold, at the end of the window. If the value of ECN_ACC is below the threshold, at 470 the window is adjusted less drastically, depending on the value of ECN_ACC.

Exactly how the window is adjusted is a matter for particular implementations.

It could be incremented by one if the value of ECN_ACC is less than four (<4) but greater than zero (>0). If less than zero (<0), the window could be exponentially incremented. If between four and eight, the congestion window might be left unaltered. If greater than or equal to eight (>or=8) the more drastic congestion reaction at 480 mentioned above, to cut the window and the value of SSTHRESH by half would be carried out.

In another example, the source could react as described above in relation to FIG. 3, and react immediately to an incoming notification, without accumulating a score. This could be appropriate if the ISQ notification is implemented without the level of congestion indication, but with the selective sending of ISQs for a proportion of the packets, and with the preliminary check of the CE bit.

Figure 7:
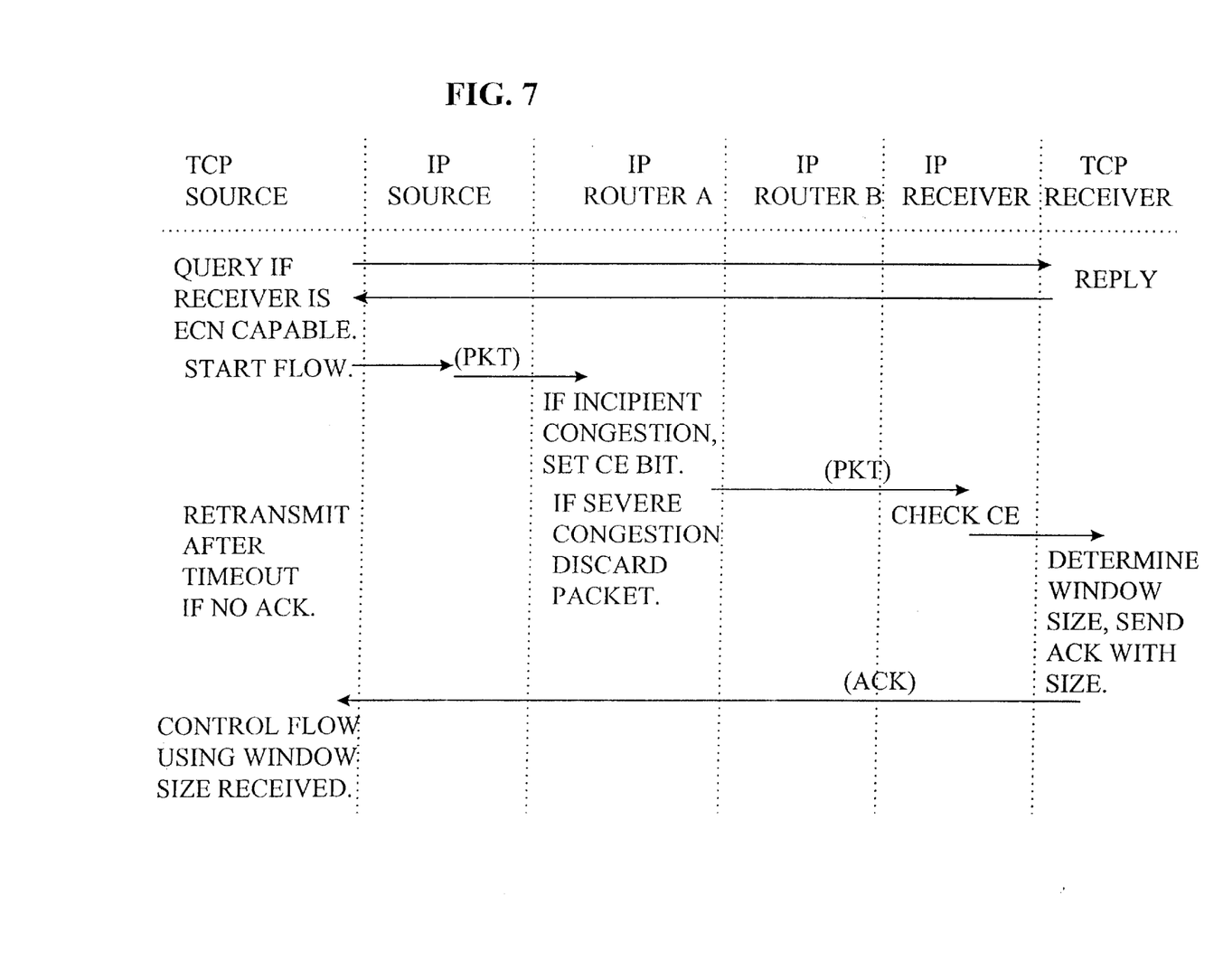
FIG. 7 shows in sequence chart form the actions of elements in a TCP/IP network corresponding to that shown in FIG. 1, according to another embodiment of the invention showing determining window size at the receiver.

FIG. 7—embodiment using receiver based flow control

FIG. 7 shows actions in a similar manner to the diagram of FIG. 4. There are two significant distinctions. Firstly, the TCP receiver, instead of sending an ACK with the ECN bit set, instead determines an offered window size and sends this with the ACK. Secondly, at the TCP source, instead of determining a revised window size on the basis of ECN notify bits in the ACK packets, instead takes the offered window size from the ACK signal, and uses that. The hardware or software in the IP receiver which is arranged to check the CE bit in the IP packet header, is an example of a packet reading means for determining if the packet has been marked by any of the nodes through which it passed, to indicate congestion at that node. The hardware or software in the TCP receiver, or invoked by the TCP receiver, is an example of a packet flow control parameter generator responsive to the packet reading means, for determining a packet flow control parameter.

The offered window size is one example of a parameter for controlling the flow. Others can be conceived. Doing the window size calculation at the receiver has a number of benefits. Firstly, there will be a faster response, because the source need not wait for all ACKs, before being able to determine accurately whether the proportion which have the ECN notify bit set is sufficient to change the window size. Secondly, redundancy is built in because many ACKs will be sent with a calculated window size. Thirdly, the accuracy of the calculation of the window size is not dependent on successful transmission of all the ACKs.

The benefit of faster response can be illustrated by an example of a worst-case scenario. If a group of ACKs are delayed by varying amounts so that some arrive at the source near the end of a window and others arrive later, if the source makes the window calculation, as in the prior art, it may determine that the next window be unaltered or larger, as only a few ACKs with ECN notify bits have arrived in time. In contrast, if the receiver makes the calculation, as soon as enough packets have arrived at the receiver with their CE bit set, thereafter all ACKs issued by the receiver will contain the reduced offered window size. These will be subject to varying delays in their path back to the TCP source. However, the fastest of them will trigger the window reduction at the TCP source. If the fastest one arrives before the end of the previous window, then the next window will be reduced in size, and thereby the amount of congestion reduced. This shows how receiver-based window calculations may give a faster response than simply sending back ECN notify bits and allowing the TCP source to make the window size calculation.

Figure 8:
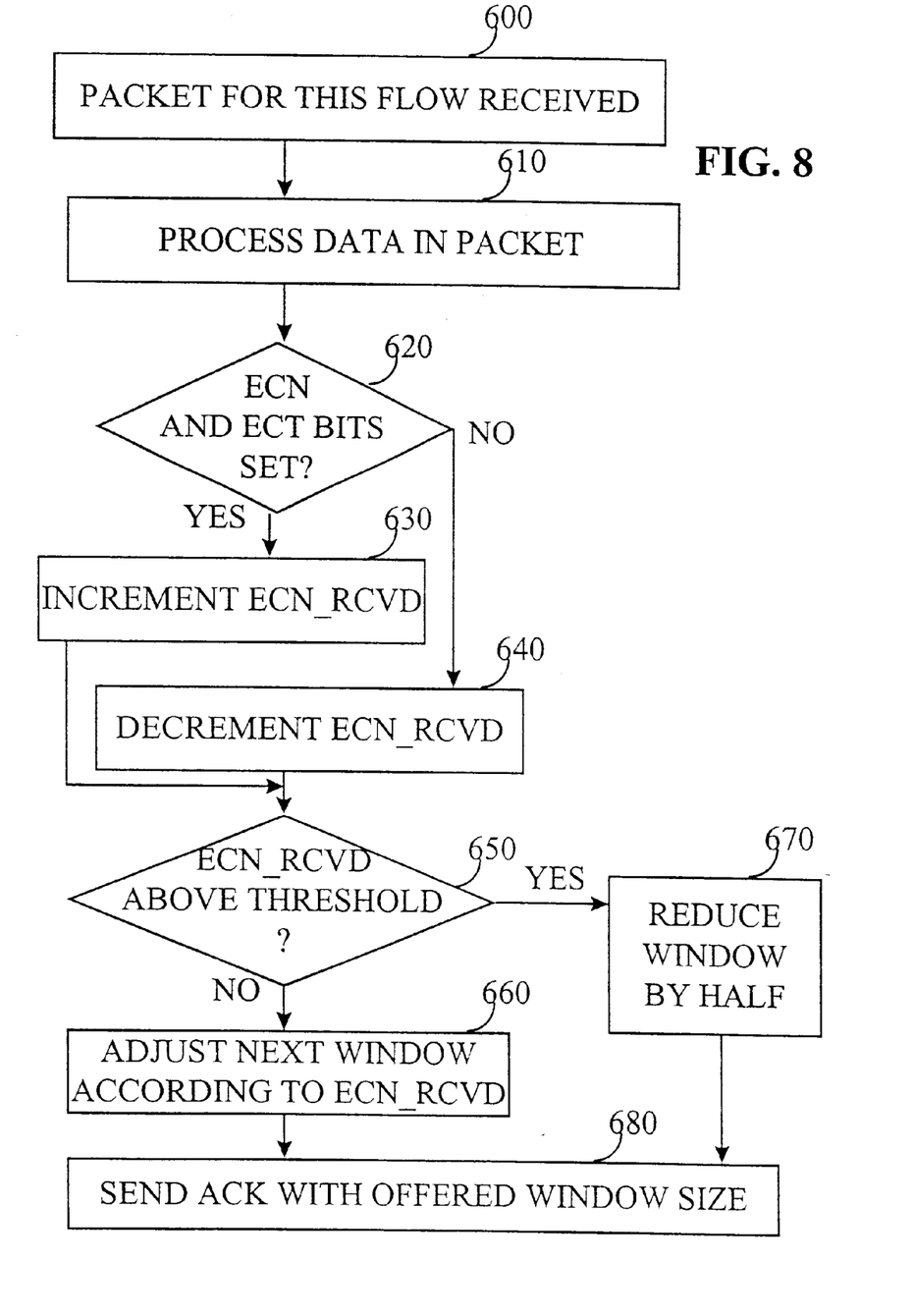
FIG. 8 shows an example of flow control actions of FIG. 7 of the TCP receiver.

FIG. 8—receiver actions in the example of FIG. 7

FIG. 8 shows in more detail the actions of the receiver in response to the arrival packets, according to the example of FIG. 7. When a packet is received, at 600, the flow is identified, from the source address field. At 610, the data in the packet is processed. Simultaneously or afterwards, at 620, there is a test for whether the packet has experienced congestion, as indicated by the ECN and ECT bits in the IP packet. If so, at 630, the value of ECN.RCVD, is incremented. This indicates an accumulation of how many packets have experienced congestion. Otherwise, if the packet has not experienced congestion, at 640, the same value is decremented.

In either case, the value of ECN.RCVD is tested to see if it is above a given threshold at 650. If so, drastic reduction in window size is made. Otherwise, a gradual alteration in the window size can be made, according to the precise value of ECN.RCVD, at 670.

The new window size is then output as an offered window size in a field in the ACK packet. This is sent to the TCP source, at 680.

Just how the window size or other control parameter is calculated in the receiver need not be specified or limited by a standard. This would enable future enhancements to be carried out without having to alter standards, or raising compatibility problems. The calculation could be carried out as part of a separate software module which could be redefined independently of other modules.

This would make it easier to tailor the calculation to take account of receiver specific parameters. For example, the receiver might have a local policy if it is in a different network domain to the source. Local conditions such as local quality of service policies, or local network characteristics may dictate a different window size calculation algorithm. For example, part of the network may be implemented over wireless connections, or satellite connections, in which case different window sizes and different control of the window size may be appropriate to take account of the different delay characteristics.

Figure 9:
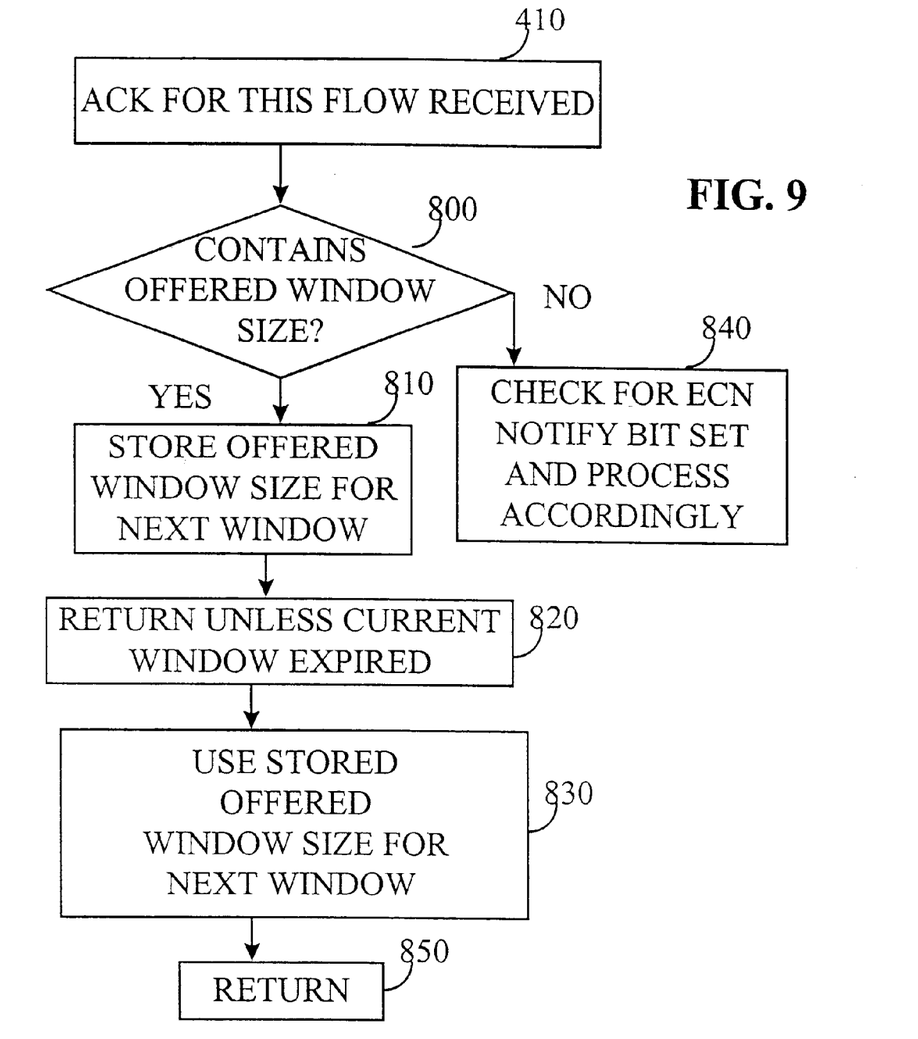
FIG. 9 shows an example of flow control actions of FIG. 7 of the TCP source.

FIG. 9—TCP source actions for the example of FIG. 7

FIG. 9 shows an example of flow control actions of FIG. 7 of the TCP source, where the receiver contributes to the flow control. At 410, an ACK is received by the source, for the given flow. Again different flows would have their own processes, windows and counters as appropriate. At 800, it is determined if the ACK contains a new offered window size, in the appropriate field in the ACK packet. If not, at 840, the source may check for an ECN notify bit, and process it as described in more detail below with reference to FIG. 11.

If there is an offered window from the receiver, this is stored for use at the end of the current window, at 810. At 820, the process returns to await more ACKs, until the end of the current window. Then at 830, the stored offered window is used for the new window. It would be possible to calculate a source window and take the smaller of the source calculated and receiver calculated window sizes, if it is desired to share the influence on the flow control between the source and the receiver.

Where a number of offered windows of different sizes are sent back by the receiver, the source could choose the smallest, or some other selection algorithm could be implemented.

Figure 10:
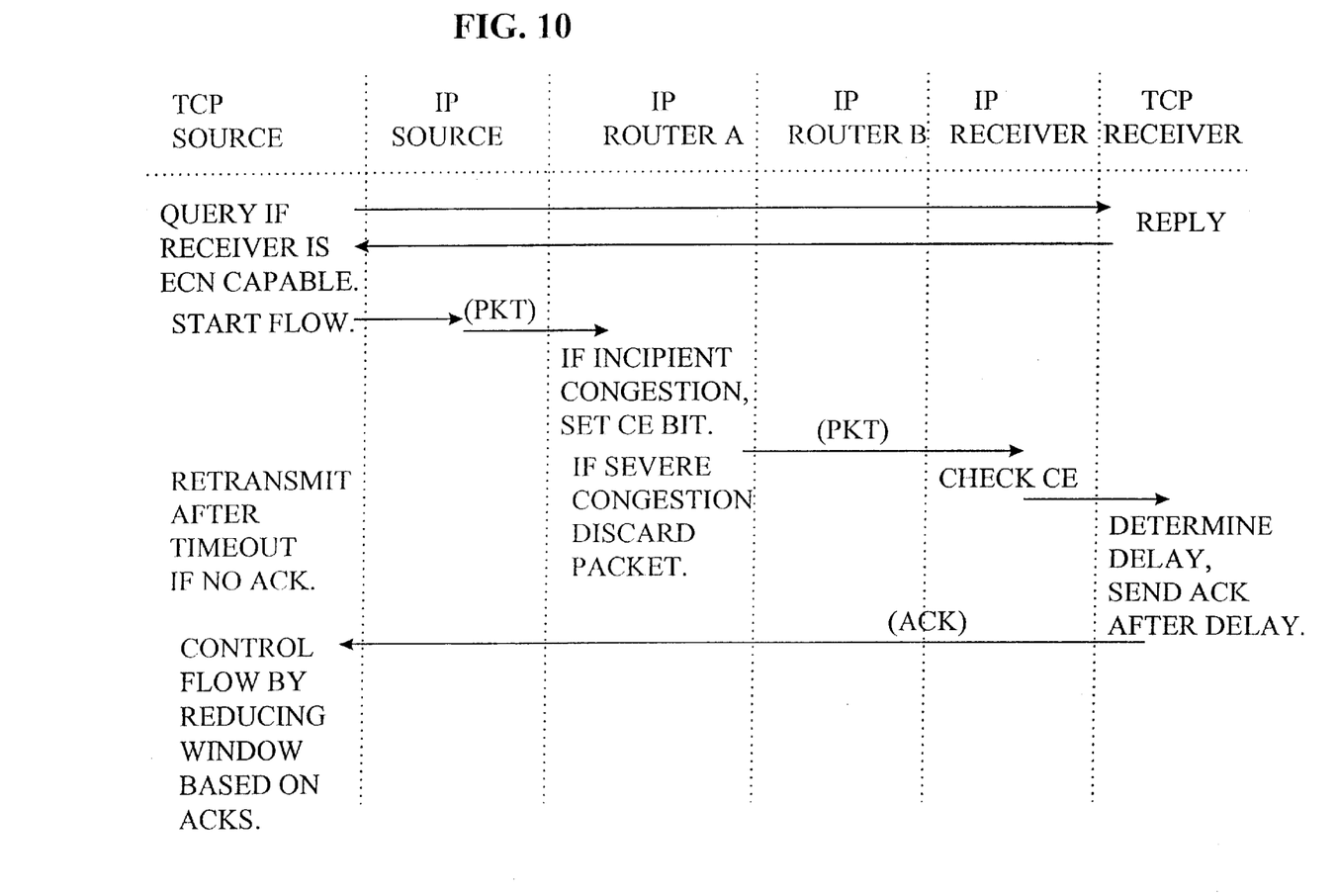
FIG. 10 shows in sequence chart form the actions of elements in a TCP/IP network corresponding to that shown in FIG. 1, according to another embodiment of the invention showing delaying ACK at the receiver.

FIG. 10, alternative embodiment using receiver based flow control

FIG. 10 shows in sequence chart form the actions of elements in a TCP/IP network corresponding to that shown in FIG. 1, according to another embodiment showing flow control by delaying ACK at the receiver. This shows how the IP receiver may check the CE bit as in the example shown in FIG. 7, but the actions of the TCP receiver and TCP source differ from that example. Instead of adding a window size to the ACK, or setting the ECN notify bit, as in FIG. 3, the TCP receiver determines a delay for the ACK, based on the congestion indications from the current packet, and from preceding packets. The ACK is sent after the delay, and the TCP source reacts accordingly.

The TCP source reacts to delayed ACKs by assuming that the delays are being caused by congestion, and so reduces its flow rate by reducing the window size. As it does not rely on the source processing any ECN bits, this has the advantage that it can be used with non ECN capable sources, and needs no ECN negotiation when setting up a flow. Furthermore, there is no reliance on particular fields in a TCP packet header, so in principle it can be used with other layer four protocols running over IP. The receiver could be arranged to set the ECN notify bit as well, for the source to use if it is ECN capable, since these may enable the receiver to control the flow more accurately, since they will make the source response less dependent on any transit delays for the ACKs.

Figure 11:
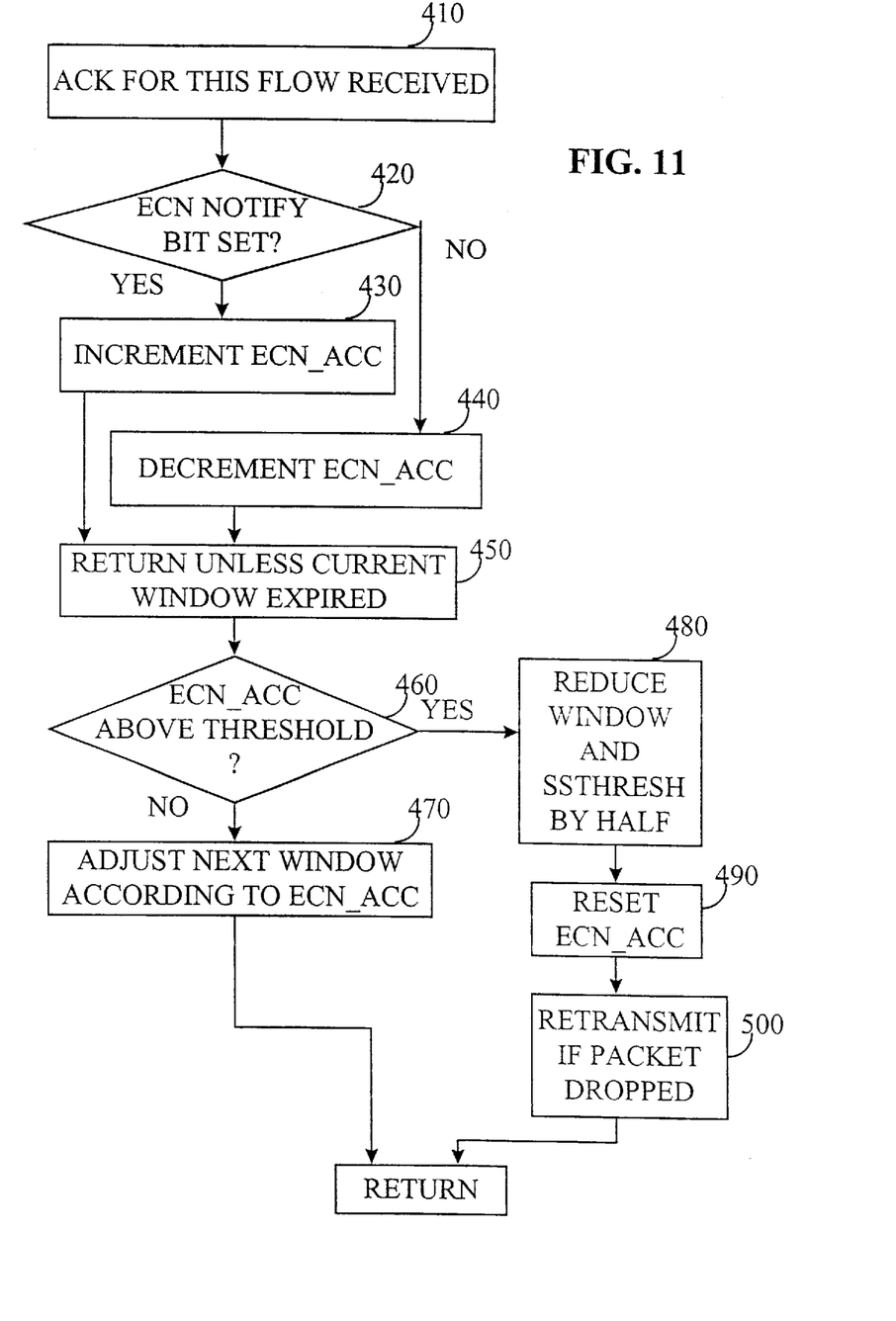
FIG. 11 shows an example of flow control actions of FIG. 4, 7 or 10 of a TCP source receiving an ACK with the ECN notify bit set.

FIG. 11,—alternative TCP source actions for the example of FIG. 4,7 or 10

FIG. 11 shows an example of flow control actions of FIG. 4,7 or 10 of a TCP source receiving an ACK with the ECN notify bit set. This response may be arranged to occur in conjunction with or as an alternative to flow control based on other inputs. If an ACK is received at 410, the TCP source determines at 420 if the EC notify bit has been set. If so, an accumulating count of congestion notifications, labelled ECN_ACC is incremented at 430. Otherwise, at 440, if an ACK is received without the EC notify bit being set, the value of ECN_ACC is decremented at 440. The process returns at 450 to await the end of the window. At the end of the window, the window adjustment may be made in the same way as described in relation to FIG. 6, reference numerals 460–500. By accumulating a score of congestion notifications, instead of reacting to the first notification in each window, as described with respect to FIG. 3, better control can be achieved. For example transient congestion once per window may not merit reducing the window size.
Hardware examples.

In principle, the source, receiver, router, and other elements described above, could be implemented on a wide range of different types of well known hardware. If speed of operation or capacity are not overriding factors, the OSI layer 3 and 4 functions could be implemented as software processes on a general purpose workstation. Dedicated hardware could be used for specific functions to improve speed, as would be well known. Protocol specific hardware such as linecards, and physical transmission links between remote computers would be used for lower OSI layer functions. The choices are matters of implementation following established principles, and need not be described further here.
Other Variations Although in the embodiments described, TCP is used, other similar OSI layer four protocols may be used. Likewise, although examples have been described using IP, other OSI layer three protocols may be used as appropriate. The intermediate nodes have been described using the example of a router, though this should not be read as excluding other intermediate nodes where congestion could occur. Other variations within the scope of the claims will be apparent to persons of average skill in the art, and are not intended to be excluded.

What is claimed is:

1. A receiver apparatus for use in a packet network comprising a plurality of nodes, the apparatus comprising:
   an input for receiving a packet sent from a source;
   a packet reader for determining if the packet has been marked by a node through which it passed, to indicate congestion at that node;
   a packet flow control parameter generator responsive to the packet reader for determining a packet flow control parameter, the packet flow control parameter generator being arranged to be dependent on whether preceding packets were marked; and
   an output for sending a message to the source, to control the flow of packets from the source, according to the packet flow control parameter,
   wherein the message to the source includes the packet flow control parameter, and
   wherein the packet flow control parameter comprises an offered window size, for indicating to the source node how many packets can be sent before the source should wait for an acknowledgement from the receiver.

2. The receiver apparatus of claim 1, the message being an acknowledgment of receipt of the packet.

3. The receiver apparatus of claim 1, wherein
an Internet Control Message Protocol (ICMP) Source Quench (ISQ) message is sent by a congested node to an upstream node if at least one of:
   a Congestion Experienced (CE) bit has not been set in the packet by an upstream node,
   the congestion in the congested node is more severe than in the upstream node, and
   the congestion in the congested node requires the packet to be discarded.

4. A receiver apparatus for use in a packet network comprising a plurality of nodes, the apparatus comprising:
   an input for receiving a packet sent from a source;
   a packet reader for determining if the packet has been marked by a node through which it passed, to indicate congestion at that node;
   a packet flow control parameter generator responsive to the packet reader for determining a packet flow control parameter; and
   an output for sending a message to the source, to control the flow of packets from the source, according to the packet flow control parameter,
   wherein the message to the source includes the packet flow control parameter, the message being an acknowledgment of receipt of the packet,
   wherein the packet flow control parameter comprises an offered window size, for indicating to the source node how many packets can be sent before the source should wait for an acknowledgement from the receiver, and
   wherein the output is configured to delay the acknowledgment on the basis of the packet flow control parameter.

5. A receiver apparatus for use in a packet network comprising a plurality of nodes, the apparatus comprising:
   an input for receiving a packet sent from a source;
   a packet reader for determining if the packet has been marked by a node through which it passed, to indicate congestion at that node;
   a packet flow control parameter generator responsive to the packet reader for determining a packet flow control parameter; and
   an output for sending a message to the source, to control the flow of packets from the source, according to the packet flow control parameter,
   wherein the message to the source includes the packet flow control parameter, the message being an acknowledgment of receipt of the packet,
   wherein the packet flow control parameter comprises an offered window size, for indicating to the source node how many packets can be sent before the source should wait for an acknowledgement from the receiver, and
   wherein the output is configured to send the same packet flow control parameter again in an acknowledgment sent in response to a subsequent packet.

6. The receiver apparatus of claim 1, the packet flow control parameter generator being operable additionally according to a receiver specific parameter.

7. The receive apparatus of claim 1, the packet flow control parameter generator being operable according to redefinable parameters.

8. A source node apparatus for use in a packet network comprising a plurality of nodes, the apparatus comprising:
   a packet sender for sending a packet across the packet network to one of the nodes acting as a receiving node;

a receiver for receiving from the receiving node a packet flow control parameter sent across the packet network; and a flow controller coupled to the packet sender for controlling a rate of flow of sending further packets from the packet sender to the receiving node on the basis of the packet flow control parameter, wherein the packet flow control parameter comprises an offered window size, for indicating to the source node apparatus how many packets can be sent before the source node apparatus should wait for an acknowledgement from the receiving node, and wherein the packet flow control parameter is sent at least by a congested node along a network path between the packet sender and the receiving node.

9. The source node apparatus of claim 8, wherein an Internet Control Message Protocol (ICMP) Source Quench (ISQ) message is sent by a congested node to the source node apparatus if at least one of:
  a Congestion Experienced (CE) bit has not been set in the packet by an upstream node,
  the congestion in the congested node is more severe than in the upstream node, and
  the congestion in the congested node requires the packet to be discarded.

10. The source node apparatus of claim 8, wherein the receiver is configured to receive congestion notification messages from other nodes in the path of the packet between the source node and the receiving node, the flow controller being operable to control the rate of flow on the basis of the congestion notification messages received from the other nodes.

11. A method of processing packets in a packet network comprising a receiver node, a source node and intermediate nodes, the method comprising the steps of:
  at the receiver node:
    receiving a packet sent across the network;
    determining if the packet has been marked by any of the nodes through which it passed, to indicate congestion at that node;
    determining a packet flow control parameter on the basis of the determination of a marking;
    sending a message to the source node, according to the packet flow control parameter; and
    delaying sending the message from the receiver node, on the basis of the flow control parameter; and
  at the source node:
    receiving the message; and
    controlling a rate of flow of sending further packets to the receiving node on the basis of the message,
    wherein the packet flow control parameter comprises an offered window size, for indicating to the source node how many packets can be sent before the source node should wait for an acknowledgement from the receiving node, and
    wherein the flow controlling step is made by the source on the basis of the time of arrival of the message.

12. The method of claim 11, wherein an Internet Control Message Protocol (ICMP) Source Quench (ISQ) message is sent by a congested node to an upstream node if at least one of:
  a Congestion Experienced (CE) bit has not been set in the packet by an upstream node,
  the congestion in the congested node is more severe than in the upstream node, and
  the congestion in the congested node requires the packet to be discarded.

13. The method of claim 11, further comprising the steps of: at the source node,
  receiving the message; and
  controlling a rate of flow of sending further packets to the receiving node on the basis of the message.

14. The method of claim 13, the message containing the packet flow control parameter, and the controlling step being made on the basis of the parameter.

15. A method of processing packets in a packet network comprising a receiver node, a source node and intermediate nodes, the method comprising the steps of: at the receiver node,
  determining if the intermediate nodes are able to send congestion notification messages to the source node;
  receiving a packet sent across the network;
  determining if the packet has been marked by any of the nodes through which it passed, to indicate congestion at that node;
  determining a packet flow control parameter on the basis of the determination of a marking, the step of determining the packet flow control parameter being carried out on the basis of whether the intermediate nodes are capable of sending congestion notification messages to the source;
  sending a message to the source node, according to the packet flow control parameter;
  wherein the packet flow control parameter comprises an offered window size, for indicating to the source node how many packets can be sent before the source node should wait for an acknowledgement from the receiving node.

16. A method of using an application to transmit data across a network, the application causing the network to use a receiver apparatus as set out in claim 1, to transmit the data.

17. Software on a computer readable medium for carrying out a method of processing packets in an Internet Protocol network comprising a receiver node, a source node and other nodes, the method comprising the steps of: at the receiver node,
  receiving a packet;
  determining if the packet has been marked by any of the nodes through which it passed, to indicate congestion at that node;
  determining whether preceding packets were marked;
  determining a packet flow control parameter on the basis of the determination of a marking and the determination of whether preceding packets were marked; and
  sending a message to the source node across the Internet Protocol network, to control the flow of packets from the source, according to the packet flow control parameter,
  wherein the packet flow control parameter comprises an offered window size, for indicating to the source node how many packets can be sent before the source node should wait for an acknowledgement from the receiving node.

18. The software of claim 12, wherein an Internet Control Message Protocol (ICMP) Source Quench (ISQ) message is sent by a congested node to an upstream node if at least one of:
  a Congestion Experienced (CE) bit has not been set in the packet by an upstream node,
  the congestion in the congested node is more severe than in the upstream node, and
  the congestion in the congested node requires the packet to be discarded.

* * * * *